US012647398B2

(12) United States Patent
Huang et al.

(10) Patent No.: US 12,647,398 B2
(45) Date of Patent: Jun. 2, 2026

(54) METHOD AND SYSTEM FOR EXPLICIT CONGESTION NOTIFICATION AND TUNNEL PRIORITIZATION

(71) Applicant: Verizon Patent and Licensing Inc., Basking Ridge, NJ (US)

(72) Inventors: Chien-Yuan Huang, Basking Ridge, NJ (US); Suzann Hua, Beverly Hills, CA (US); Tony Ferreira, Fairfield, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 263 days.

(21) Appl. No.: 18/472,354

(22) Filed: Sep. 22, 2023

(65) Prior Publication Data

US 2025/0106187 A1 Mar. 27, 2025

(51) Int. Cl.
*H04L 9/40* (2022.01)
*H04L 47/2425* (2022.01)

(52) U.S. Cl.
CPC ........ *H04L 63/029* (2013.01); *H04L 47/2433* (2013.01); *H04L 63/0435* (2013.01)

(58) Field of Classification Search
CPC .............. H04L 63/029; H04L 47/2433; H04L 63/0435; H04L 63/164
See application file for complete search history.

(56) References Cited

U.S. PATENT DOCUMENTS

2013/0304796 A1* 11/2013 Jackowski .............. H04L 65/80
709/202
2025/0203675 A1* 6/2025 Gandotra .......... H04W 28/0268

* cited by examiner

*Primary Examiner* — Izunna Okeke

(57) ABSTRACT

A method, a network device, and a non-transitory computer-readable storage medium are described in relation to a low latency, low loss, and scalable throughput (L4S)-triggered prioritized connection service. The L4S-triggered prioritized connection service may enable an evolved packet data gateway (ePDG) to provision prioritized and non-prioritized tunnels with end devices via untrusted wireless local area networks. The prioritized tunnel may support L4S or another quality of service in which the ePDG may provide prioritized data forwarding. The end device may transmit a request that includes priority data.

20 Claims, 7 Drawing Sheets

600

RECEIVE A REQUEST TO ESTABLISH A TUNNEL FROM AN END DEVICE
605

ANALYZE THE REQUEST
610

PRIORITIZED TUNNEL?
615
YES                    NO

ESTABLISH A PRIORITIZED TUNNEL
645

ESTABLISH A NON-PRIORITIZED TUNNEL
620

ESTABLISH PRIORITIZED CONNECTIONS
650

ESTABLISH NON-PRIORITIZED CONNECTIONS
625

GENERATE AND STORE PRIORITY INFORMATION
655

GENERATE AND STORE PRIORITY INFORMATION
630

DETECT AN APPLICATION SESSION
660

DETECT AN APPLICATION SESSION
635

PERFORM PRIORITIZED DATA FORWARDING
665

PERFORM DATA FORWARDING
640

600

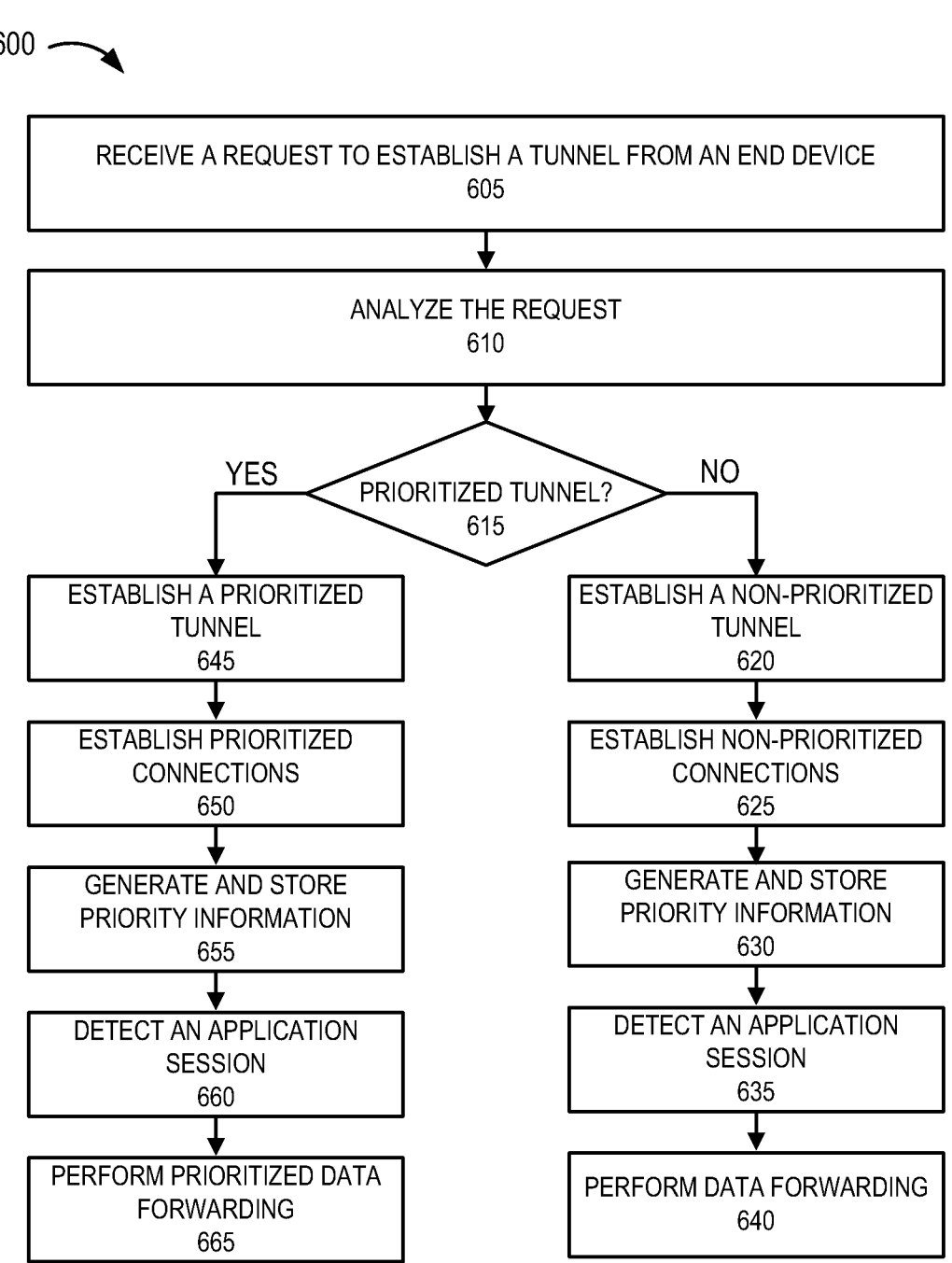

RECEIVE A REQUEST TO ESTABLISH A TUNNEL FROM AN END DEVICE
605

ANALYZE THE REQUEST
610

YES          PRIORITIZED TUNNEL?          NO
615

ESTABLISH A PRIORITIZED TUNNEL
645

ESTABLISH A NON-PRIORITIZED TUNNEL
620

ESTABLISH PRIORITIZED CONNECTIONS
650

ESTABLISH NON-PRIORITIZED CONNECTIONS
625

GENERATE AND STORE PRIORITY INFORMATION
655

GENERATE AND STORE PRIORITY INFORMATION
630

DETECT AN APPLICATION SESSION
660

DETECT AN APPLICATION SESSION
635

PERFORM PRIORITIZED DATA FORWARDING
665

PERFORM DATA FORWARDING
640

Fig. 6

METHOD AND SYSTEM FOR EXPLICIT CONGESTION NOTIFICATION AND TUNNEL PRIORITIZATION

BACKGROUND

End devices may connect to a radio access network (RAN) according to various types of configurations and may be afforded different quality of service (QOS) levels. Various mechanisms and technologies may be used to ensure the delivery of certain performance metrics, such as minimal latency and packet loss, as well as high throughput and other types of network performance criteria. Low latency, low loss, and scalable throughput (L4S) is a technology whose aim is to drastically reduce latency experienced by packets traveling across the Internet and support high throughput.

BRIEF DESCRIPTION OF THE DRAWINGS

FIG. 6 is a flow diagram illustrating an exemplary process of an exemplary embodiment of the L4S-triggered prioritized connection service.

DETAILED DESCRIPTION

The following detailed description refers to the accompanying drawings. The same reference numbers in different drawings may identify the same or similar elements. Also, the following detailed description does not limit the invention.

L4S mechanisms may drastically reduce latency experienced by packets traveling across the Internet and may support high throughput. L4S may provide fast rate adaptation management and may reduce network congestion, queuing, and packet loss. An Explicit Congestion Notification (ECN) scheme at the Internet Protocol (IP) layer may be used to support L4S.

While L4S technology may benefit users of a mobile network, users in an untrusted wireless environment, such as a Wi-Fi environment, may not be afforded with L4S. For example, an evolved packet data gateway (ePDG) may afford access and connectivity to a core network and application layer networks on behalf of a Wi-Fi user. However, the connection (e.g., a tunneled connection, such as an Internet Protocol Security (IPsec) tunnel) between the ePDG and the end device via a Wi-Fi device may not afford priority to traffic that would support L4S criteria and ECN, for example. Rather, the ePDG may treat any and all traffic among IPsec connections or tunnels (referred to simply as IPsec tunnels) with end devices equally and without any priority.

According to exemplary embodiments, an L4S-triggered prioritized connection service is described herein. According to an exemplary embodiment, the L4S-triggered prioritized connection service may be implemented by a network device. For example, the network device may be implemented as an ePDG, a wireless access gateway (WAG), a tunnel termination gateway (TTG), or a similar type of legacy network device (referred to simply as an ePDG). According to an exemplary embodiment, the ePDG and an end device may establish a prioritized IPsec tunnel via an untrusted network device, based on L4S and ECN information, as described herein. According to another exemplary embodiment, the ePDG may establish a prioritized IPsec tunnel via an untrusted network device, based on a QoS metric other than L4S, as described herein.

According to an exemplary embodiment, the ePDG may generate and manage context information associated with prioritized and non-prioritized IPsec tunnels. According to an exemplary embodiment, the ePDG may prioritize data transfer of traffic, in the uplink and downlink, associated with the prioritized IPsec tunnel relative to uplink and downlink traffic associated with a non-prioritized IPsec tunnel.

In view of the foregoing, the L4S-triggered prioritized connection service may improve the provisioning of IPsec tunnels associated with the ePDG, untrusted network devices, and end devices. Additionally, the L4S-triggered prioritized connection service may enhance access and use of application services via the ePDG and an untrusted network device, based on prioritized IPsec tunnels that support L4S or another QoS, and ECN.

Figure 1:
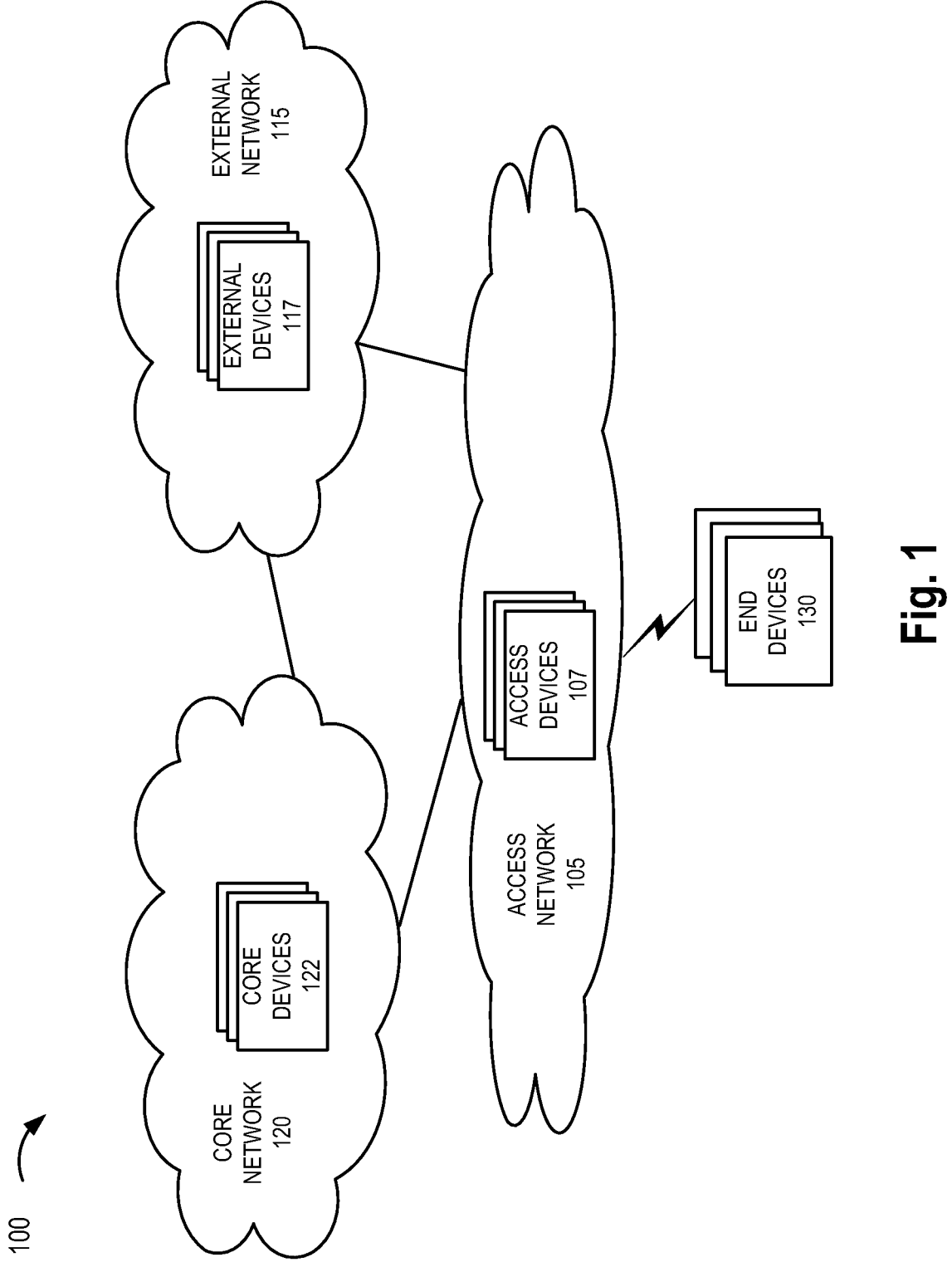
FIG. 1 is a diagram illustrating an exemplary environment in which an exemplary embodiment of an L4S-triggered prioritized connection service may be implemented.

FIG. 1 is a diagram illustrating an exemplary environment 100 in which an exemplary embodiment of an L4S-triggered prioritized connection service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane (CP), a user plane (UP), and a network management plane. Environment 100 may include other types of planes of communication. A message communicated in support of the L4S-triggered prioritized connection service may use at least one of these planes of communication.

Access network 105 may include one or multiple networks of one or multiple types and technologies. For example, access network 105 may be implemented to include a Fifth Generation (5G) RAN, a future generation RAN, a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultrawide band (UWB) node, a future generation wireless access device (e.g., a 6G wireless station, a 7G wireless station, or another generation of wireless station).

Access device 107 may include other types of wireless access devices, such as a WiFi device, a hotspot device, and/or a fixed wireless access customer premise equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an ePDG, a WAG, a TTG, a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM/UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the L4S-triggered prioritized connection service. For example, an ePDG may provide an exemplary embodiment of the L4S-triggered prioritized connection service, as described herein. The ePDG may establish a prioritized secure and authenticated connection (e.g., a prioritized IPsec tunnel) with end device 130 via an untrusted and/or unsecure access device 107, such as a Wi-Fi device, a hotspot device, a femtocell, an Ethernet device, or the like. The prioritized IPsec tunnel may include prioritized IPsec tunnels that support control plane messaging and user plane traffic. According to an exemplary embodiment, the ePDG may establish the prioritized IPsec tunnel based on information received from end device 130, as described. According to an exemplary embodiment, the ePDG may generate and manage context information pertaining to the prioritized IPsec tunnel, as described herein. During an application session, the ePDG may prioritize traffic (e.g., data forwarding) of the uplink and the downlink of the prioritized IPsec tunnel associated with end device 130 and the untrusted and/or unsecure access device 107 relative to traffic of the uplink and the downlink associated with unprioritized IPsec tunnels.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, end device 130 may include logic of an exemplary embodiment of the L4S-triggered prioritized connection service. According to an exemplary embodiment, end device 130 may generate and transmit a message, which includes data indicating a request for L4S and ECN, to the ePDG. For example, the message may be implemented as an Internet Key Exchange (IKE)v2 message. According to another exemplary embodiment, the message may include data indicating a request for a QoS metric different from L4S and ECN. For example, the QoS metric may be latency, throughput, round trip time (RTT), packet error rate, maximum bit rate, or another performance metric and performance metric value that may be provisioned for prioritization. The message may also include data indicating a request for ECN.

Figure 2:
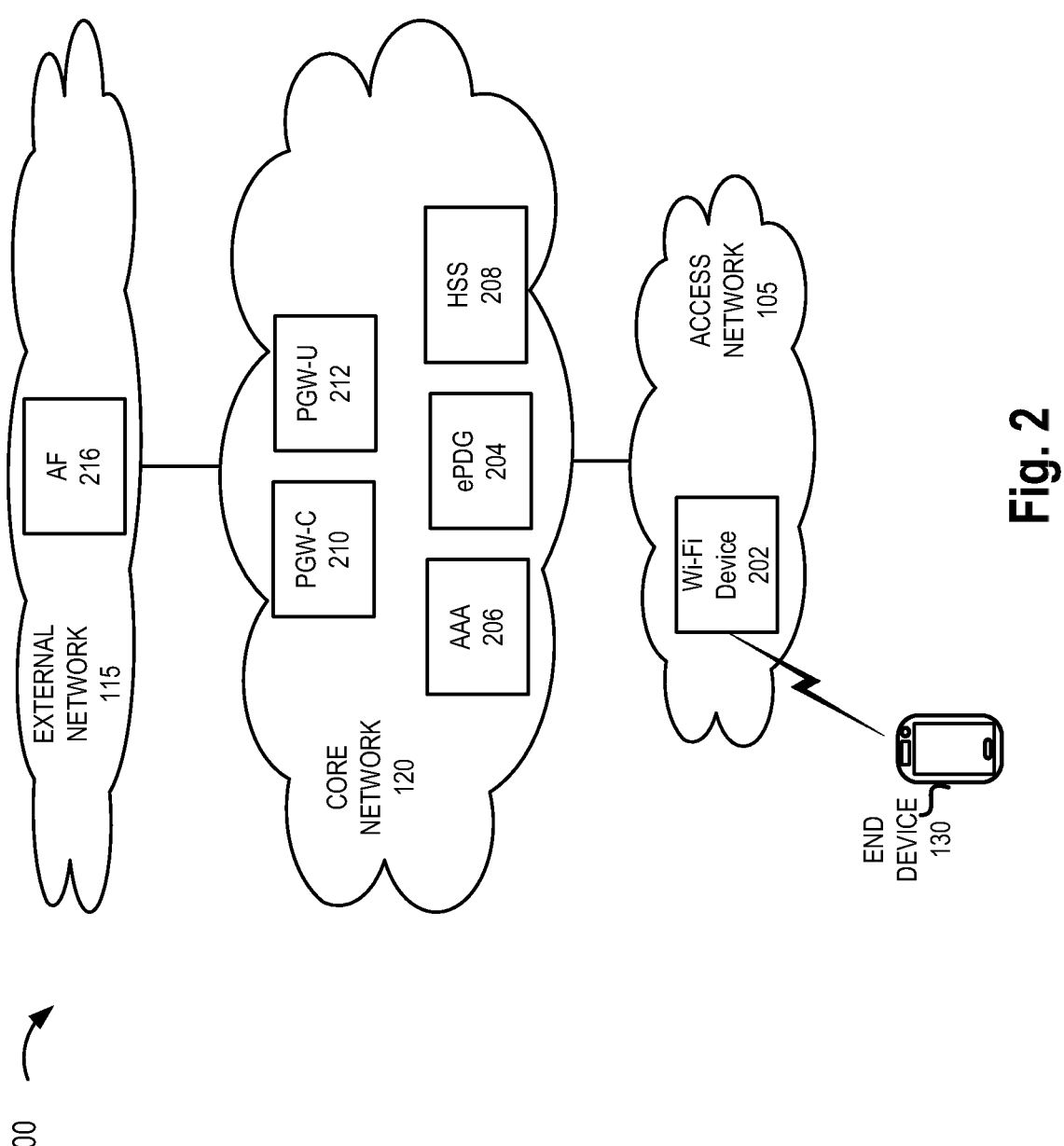
FIG. 2 is a diagram illustrating another exemplary environment in which an exemplary embodiment of the L4S-triggered prioritized connection service may be implemented.

FIG. 2 is a diagram illustrating another exemplary environment in which an exemplary embodiment of the L4S-triggered prioritized connection service may be implemented. As illustrated, exemplary environment 200 may include end device 130, a Wi-Fi device 202, an ePDG 204, an AAA 206, an HSS 208, a PGW-C 210, a PGW-U 212, and an AF 216.

Wi-Fi device 202 is an exemplary implementation of untrusted and/or unsecure access device 107. According to other exemplary implementations, the untrusted and/or unsecure access device 107 may be implemented as a hotspot device, a femtocell, a WLAN device, an Ethernet device, or the like.

ePDG 204 is an exemplary implementation of the network device or the gateway device that provides an exemplary embodiment of the L4S-triggered prioritized connection service. According to other exemplary implementations, the network device or the gateway device, as described herein, may be implemented as a WAG, a PDG, and/or a similar functioning network device.

AAA 206, HSS 208, PGW-C 210, and PGW-U 212 are exemplary implementations of core devices 122. Although not illustrated, core devices 122 may include an MME, an SGW, an SGW-U, an SGW-C, a PGW, other types of core devices 122 of a 4G core network, multi-RAT core devices 122, such as an SMF and PGW-C, and so forth. AF 216 is an exemplary implementation of external device 117.

Wi-Fi device 202 may provide a function and/or a service in connection with a network standard, such as Institute of Electrical and Electronics Engineers (IEEE) standard (e.g., IEEE 802.11) or the like, and/or of a proprietary nature pertaining to Wi-Fi.

ePDG 204, AAA 206, HSS 208, PGW-C 210, and PGW-U 212 may each provide a function and/or a service in accordance with a network standard, such as Third Generation Partnership Project (3GPP), 3GPP2, International Telecommunication Union (ITU), European Telecommunications Standards Institute (ETSI), GSM Association (GSMA), and the like and/or of a proprietary nature. For example, ePDG 204 may provide access control and data forwarding, among other functions, in relation to an untrusted and/or unsecure access device or untrusted access network, a non-3GPP access network or device, and the like relative to a 4G core network. Additionally, according to an exemplary embodiment, ePDG 204 may include logic of an exemplary embodiment of the L4S-triggered prioritized connection service, as described herein.

AAA 206 may include a network device that provides authentication, authorization, and accounting services relating to network access and use, among other functions and services.

HSS 208 may include a network device that hosts user-related and subscription related information, provide call and session establishment support, among other functions and services.

PGW-C 210 may include a network device that may control the packet processing and forwarding in PGW-U 212 by establishing, modifying, or deleting Packet Forwarding Control Protocol (PFCP) sessions, PGW-U selection, among other functions and services. PGW-U 212 may perform packet processing and forwarding in the user plane, user plane connectivity to external PDNs, policy enforcement, and packet filtering, among other functions and services.

AF 216 may host an application service that may be used by end device 130. For example, the application service may have a QoS of L4S or another tier of QoS in which ECN may be used.

Environment 200 is exemplary and according to other embodiments, environment 200 may include additional, different, and/or fewer network devices. For example, according to other exemplary embodiments, access network 105, core network 120, and/or external network 115 may include another type of access device 107, core device 122, and/or external device 117 than those illustrated and described in relation to FIG. 2.

Figure 3A:
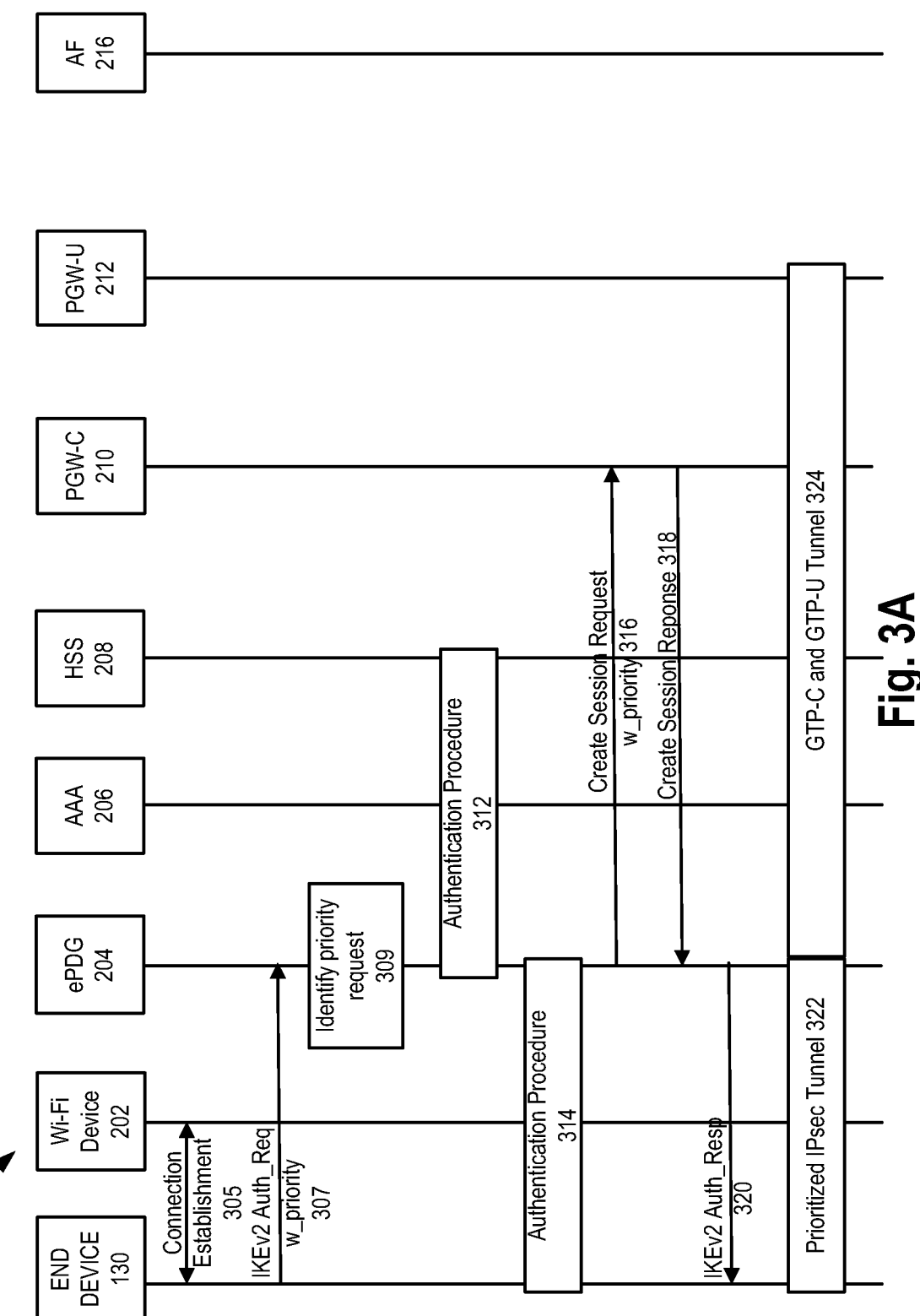
FIGS. 3A and 3B are diagrams illustrating an exemplary process of an exemplary embodiment of the L4S-triggered prioritized connection service according to an exemplary scenario.
Figure 3B:
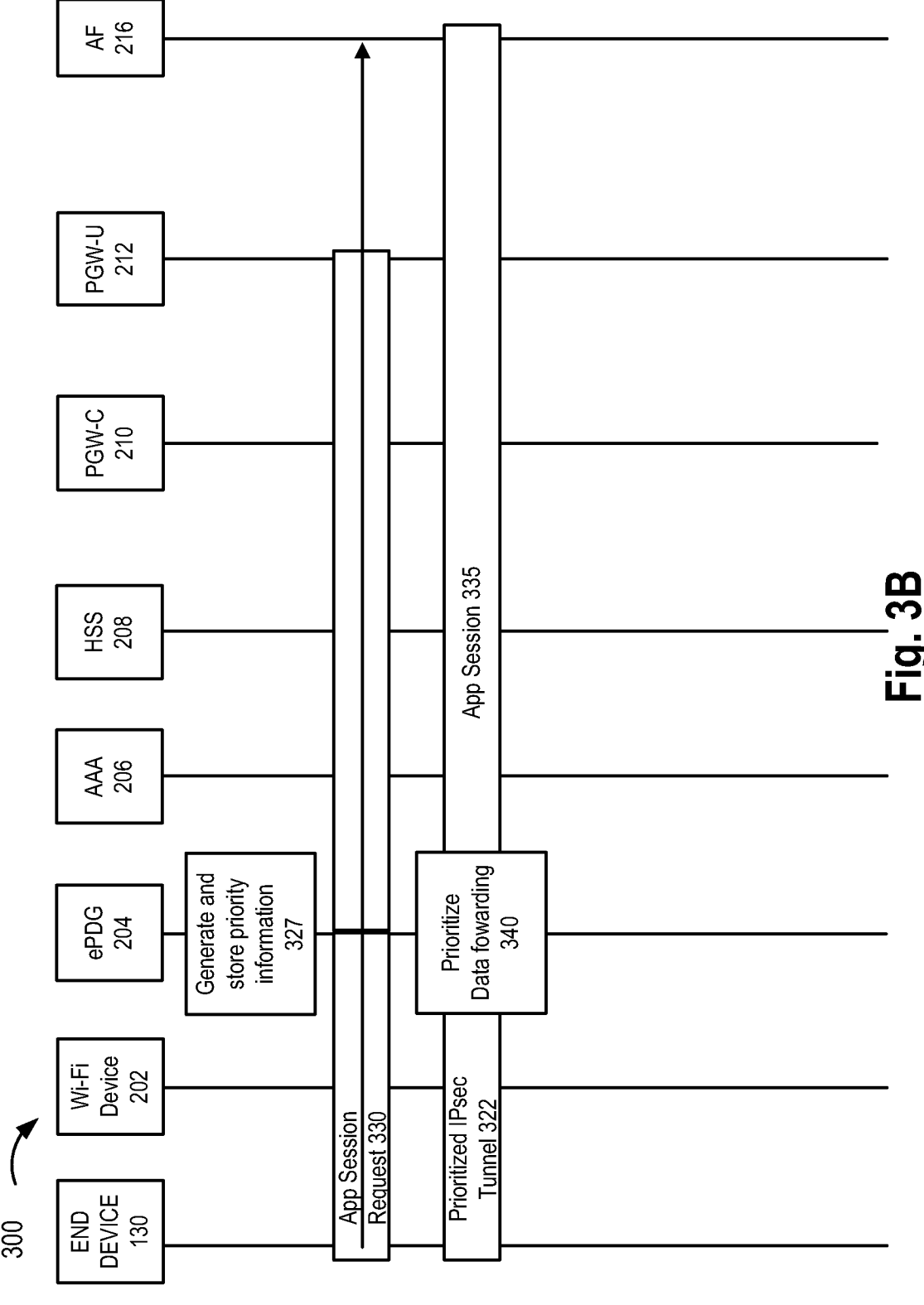

FIGS. 3A and 3B are diagrams illustrating an exemplary process 300 of an exemplary embodiment of the L4S-triggered prioritized connection service according to an exemplary scenario. For purposes of description, process 300 is described in relation to environment 200.

Referring to FIG. 3A, according to an exemplary scenario, end device 130 may establish a wireless connection with Wi-Fi device 202 based on a connection establishment 305 procedure. For example, end device 130 and Wi-Fi device 202 may exchange messages relating to probing/discovery, authentication, and association. Thereafter, end device 130 may establish an IPsec tunnel with ePDG 204 via Wi-Fi device 202. For example, end device 130 may generate and transmit an IKEv2 message, such as an IKEv2 Auth_Req message 307 that includes priority data. According to various exemplary embodiments, the priority data of IKEv2 Auth_Req 307 may include data indicating a QoS, such as L4S or another type of QoS (e.g., low RTT, etc.), ECN, or both (e.g., L4S and ECN, etc.). According to various exemplary embodiments, the priority data may be included in an information element (IE), an attribute value pair (AVP), an object, another form of a data instance, in a field in a header (e.g., an options field, an ECN field, etc.) of an IP packet or a higher layer packet (e.g., Transmission Control Protocol (TCP), etc.), or some combination of both (e.g., an IE indicating L4S and a value set in the ECN field). Auth_Req 307 may include other data, such as an identifier of end device 130, an access point name (APN), etc., which may be specified according to an IKEv2/IPsec standard or policy, for example.

In response to receiving IKEv2 Auth_Req 307, ePDG 204 may analyze (e.g., read) the message and identify 309 that the IKEv2 Auth_Req 307 includes priority data. According to this example, the priority data may indicate (a request for) ECN, which may be interpreted as L4S with ECN. As further illustrated, as a part of the authentication procedure for end device 130, messages may be communicated between ePDG 204, AAA 206, and HSS 208, which is represented as authentication procedure 312, as well as messages communicated between ePDG 204 and end device 130, which is represented as authentication procedure 314.

According to an exemplary scenario, assume that end device 130 has been successfully authenticated, and in response, ePDG 204 may generate and transmit a Create Session Req w_priority 316 to PGW-C 210. For example, based on user profile information obtained from HSS 208 via AAA 206, ePDG 204 may obtain the network address or frequency qualified domain name (FQDN) of core devices 122, such as PGW-C 210. Create Session Req 316 may include the priority data. In response to receiving Create Session Req 316, PGW-C 210 may select a PGW-U, such as PGW-U 212, in view of the priority data, and may generate and transmit a Create Session Resp 318 to ePDG 204. In response to receiving Create Session Resp 318, ePDG 204 may generate and transmit an IKEv2 Auth_Resp 320, which may include IKEv2 parameters, to end device 130. As a result, ePDG 202 may establish a prioritized IPsec tunnel 322 with end device 130. Additionally, ePDG 202 may establish control and user plane connections with other core devices 122, such as PGW-C 210 and PGW-U 212. For example, a GPRS Tunneling Protocol (GTP)-C and GTP-U tunnel 324 may be established.

Figure 4:
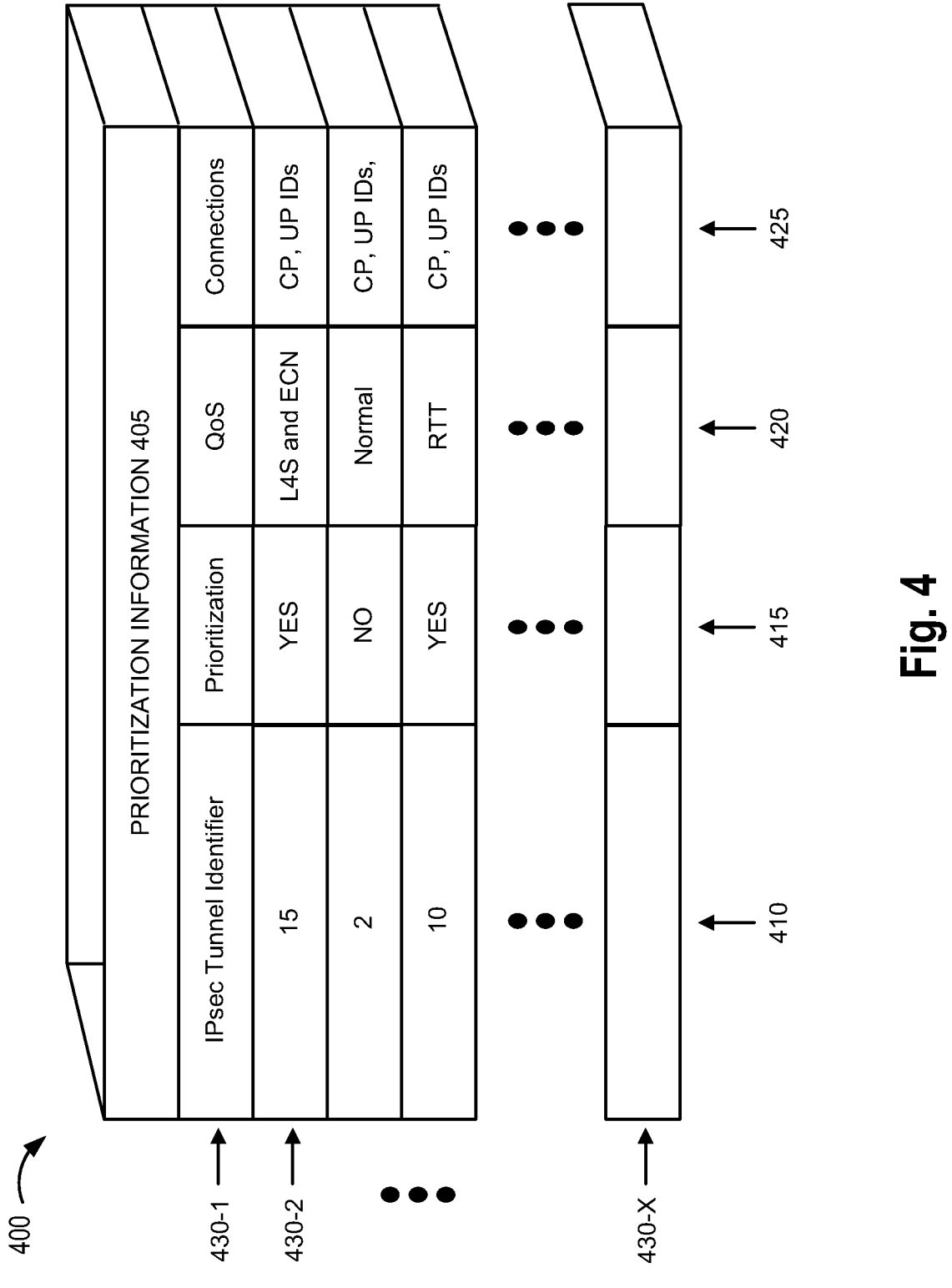
FIG. 4 is a diagram illustrating exemplary information of an exemplary embodiment of the L4S-triggered prioritized connection service.

Referring to FIG. 3B, ePDG 204 may generate and store 327 priority information pertaining to the prioritized IPsec tunnel. For example, FIG. 4 is a diagram illustrating exemplary information of an exemplary embodiment of the L4S-triggered prioritized connection service. As illustrated, a table 400 may store prioritization information 405. For example, prioritization information 405 may include an IPsec tunnel identifier field 410, a prioritization field 415, a QoS field 420, and a connections field 425. As further illustrated, prioritization information 405 may include mappings or records 430-1 through 430-X (also referred to collectively as mappings 430 or individually or generally as mapping 430) that correlate fields 410 through 425. The fields and respective values described are merely exemplary.

Prioritization information 405 is illustrated in tabular form merely for the sake of description. According to other implementations, prioritization information 405 may be implemented in a data structure different from a table (e.g., a list, a flat file, etc.), in a database, or another type of storage element.

IPsec Tunnel identifier field 410 may store data indicating an identifier of the IPsec tunnel. Prioritization field 415 may store data indicating whether the IPsec tunnel is prioritized or not. QoS field 420 may store data indicating a QoS priority. For example, QoS field 420 may store data indicating L4S with ECN, normal (e.g., no priority QoS), or a priority QoS other than L4S (e.g., RTT, etc.). Connections field 425 may store data indicating upstream context information, such as a CP core network device (e.g., PGW-C) identifier and/or network address, a UP core network device (e.g., PGW-U) identifier and/or network address, and/or other configurable context information of relevance.

According to other exemplary implementation, table 400 may store additional, fewer, and/or different instances of prioritization information 405 in support of the L4S-triggered prioritized connection service. For example, prioritization information 405 may store a unique identifier of end device 130.

Referring back to FIG. 3B and according to the exemplary scenario, assume that end device 130 transmits an application session request 330 to AF 216 via the prioritized IPsec tunnel. Thereafter, an application session 335 is established between end device 130 and AF 216. According to the exemplary scenario, application session 335 may relate to an application service with L4S criteria. As further illustrated, based on prioritization information 405, ePDG 204 may prioritize data forwarding 340 for uplink and downlink traffic of the application session. For example, ePDG 204 may identify uplink and downlink packets pertaining to the prioritized IPsec tunnel, and provide a priority data forwarding service of the L4S-triggered prioritized connection service, as described herein.

FIGS. 3A and 3B illustrate process 300 according to an exemplary scenario, however according to other exemplary scenarios and/or embodiments, process 300 may include additional, different, and/or fewer steps or operations pertaining to the L4S-triggered prioritized connection service, as described herein. The messages illustrated and described are exemplary, as well as protocols described and illustrated. Additionally, process 300 may omit the illustration and description of some messages (e.g., IKEv2 messages, Extensible Authentication Protocol (EAP) message, etc.) that may be performed for the sake of brevity.

Figure 5:
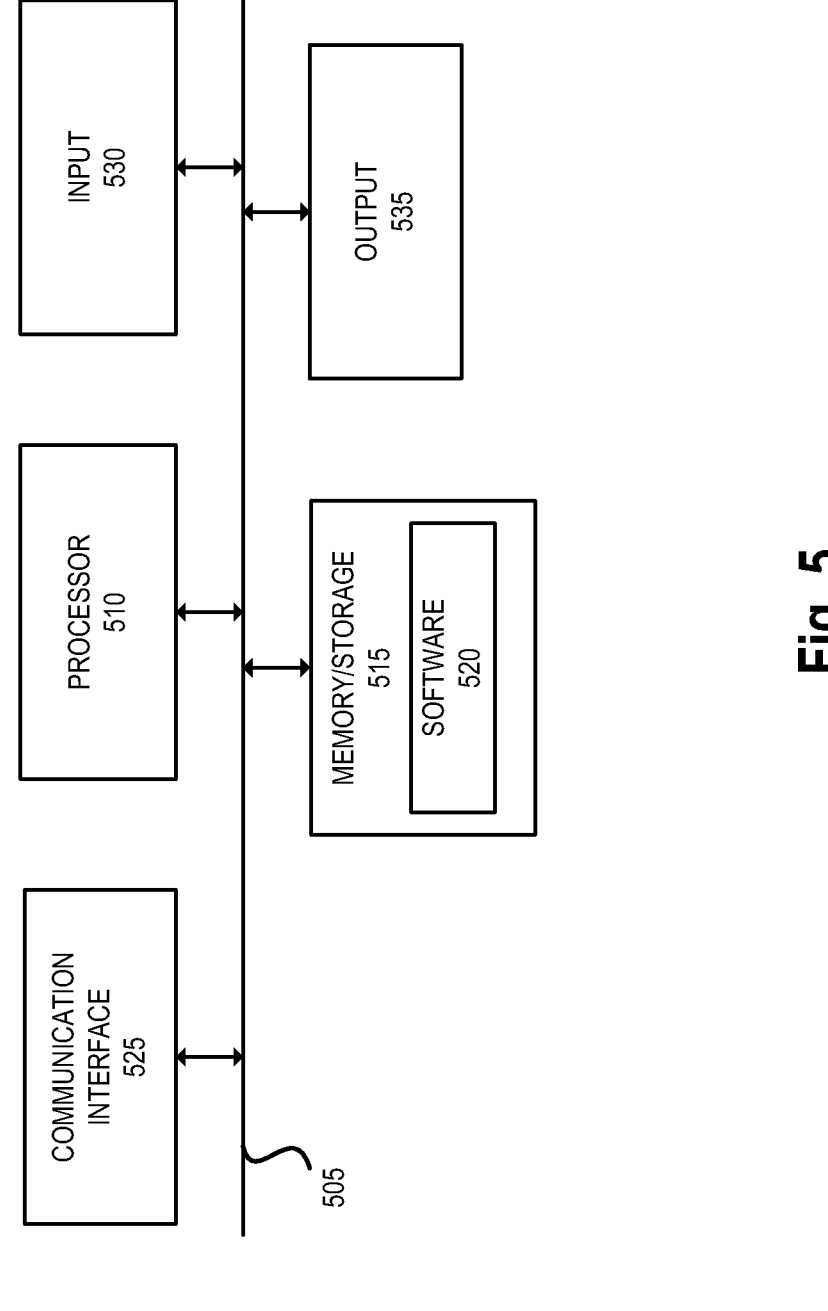
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium. Memory/storage 515 may store data, software, and/or instructions related to the operation of device 500.

Software 520 includes an application or a program that provides a function and/or a process. As an example, with reference to core device 122 (e.g., ePDG 204, etc.), software 520 may include an application that, when executed by processor 510, provides a function and/or a process of the L4S-triggered prioritized connection service, as described herein. According to another example, with reference to end device 130, software 520 may include an application that, when executed by processor 510, provides a function and/or a process of the L4S-triggered prioritized connection service, as described herein. Software 520 may also include firmware, middleware, microcode, hardware description language (HDL), and/or another form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, optical interfaces, and/or wired interfaces. For example, communication interface 525 may include one or multiple transmitters and receivers, or transceivers. Communication interface 525 may operate according to a protocol stack and a communication standard. Communication interface 525 may support one or multiple MIMO, beamforming, and/or transmission/reception configurations.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 500 may be configured to perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 may be configured to perform a function or a process described herein based on the execution of hardware (processor 510, etc.).

FIG. 6 is a flow diagram illustrating an exemplary process 600 of an exemplary embodiment of the L4S-triggered prioritized connection service. According to an exemplary embodiment, an ePDG may perform process 600. According to an exemplary implementation, processor 510 executes software 520 to perform a step (in whole or in part) of process 600, as described herein. Alternatively, a step (in whole or in part) may be performed by execution of only hardware. For purposes of description only, process 600 is described as being performed by the ePDG, such as ePDG 204.

Referring to FIG. 6, in block 605, the ePDG may receive a request to establish a tunnel from an end device. For example, the ePDG may receive an IKEv2 message, which includes priority data, as described herein, to establish a prioritized IPsec tunnel.

In block 610, the ePDG may analyze the request. For example, the ePDG may read and interpret the request, which includes the priority data.

In block 615, the ePDG may determine, based on the analysis, whether the request is for a prioritized or non-prioritized tunnel. For example, as a binary choice, the ePDG may determine whether the request is for a prioritized IPsec tunnel or a normal or non-prioritized IPsec tunnel.

When the ePDG determines that the request is for a non-prioritized tunnel (block 615—NO), the ePDG may establish a non-prioritized tunnel, such as a non-prioritized IPsec tunnel with the end device via an untrusted and/or unsecure access device, as described herein (block 620).

In block 625, the ePDG may establish non-prioritized connections. For example, the ePDG may establish non-prioritized control and user plane connections with upstream network devices, such as core devices, as described herein. In block 630, the ePDG may generate and store priority information regarding the non-prioritized tunnel, as described herein.

In block 635, the ePDG may detect an application session. For example, the ePDG may detect an establishment of the application session (e.g., from the end device or an AF) that relates to the non-prioritized IPsec tunnel and the end device. By way of further example, the ePDG may detect or identify an application session request or a packet data network (PDN) session establishment request. The requested application service may relate to messaging or another application service with non-prioritized QoS criteria, for example. In block 640, the ePDG may perform normal or non-prioritized data forwarding regarding packets of the application session.

Alternatively, when the ePDG determines that the request is for a prioritized tunnel (block 615—YES), the ePDG may establish a prioritized tunnel, such as a non-prioritized IPsec tunnel with the end device via an untrusted and/or unsecure access device, as described herein (block 645).

In block 650, the ePDG may establish prioritized connections. For example, the ePDG may establish prioritized control and user plane connections with upstream network devices, such as core devices, as described herein. The ePDG may provide the priority data included in the request, in whole or in part, to one or more of the upstream network devices. In block 655, the ePDG may generate and store priority information regarding the prioritized tunnel, as described herein.

In block 660, the ePDG may detect an application session. For example, the ePDG may detect an establishment of the application session (e.g., from the end device or an AF) that relates to the prioritized IPsec tunnel and the end device. By way of further example, the ePDG may detect or identify an application session request or a packet data network (PDN) session establishment request. The requested application service may relate to an AR application or another application service with L4S criteria or another prioritized QoS criteria, for example. In block 665, the ePDG may perform prioritized data forwarding regarding packets of the application session based on the prioritized QoS (e.g., L4S, etc.).

FIG. 6 illustrates an exemplary process 600 of the L4S-triggered prioritized connection service, however, according to other exemplary embodiments, the L4S-triggered prioritized connection service may perform additional operations, fewer operations, and/or different operations than those illustrated and described in relation to FIG. 6.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
 receiving, by one or more network devices from an end device via an untrusted network device, a request, which includes priority data, to establish a prioritized tunnel with the end device;
 determining, by the one or more network devices based on the request, whether to provide the prioritized tunnel or a non-prioritized tunnel, which is a binary choice,
 establishing, by the one or more network devices based on the determining, the prioritized tunnel;
 receiving, by the one or more network devices, packets of an application session pertaining to the end device and the prioritized tunnel; and
 performing, by the one or more network devices, prioritized data forwarding of the packets.

2. The method of claim 1, wherein the priority data indicates at least one of explicit congestion notification (ECN) or low latency, low loss, scalable throughput (L4S).

3. The method of claim 1, wherein the request includes an Internet Key Exchange (IKE) authentication message.

4. The method of claim 1, further comprising:
 storing, by the one or more network devices, information pertaining to tunnels with end devices, wherein the information indicates some of the tunnels are prioritized and some of the tunnels are not prioritized.

5. The method of claim 1, wherein the prioritized tunnel is an Internet Protocol Security (IPsec) tunnel and the one or more network devices are is an evolved packet data gateway (ePDG).

6. The method of claim 1, further comprising:
 transmitting, by the one or more network devices, a message, which includes the priority data, to an upstream core network device of a core network; and
 establishing, by the one or more network devices, control plane and user plane connections in the core network that relate to the prioritized tunnel and the end device.

7. The method of claim 1, wherein the prioritized data forwarding pertains to low latency, low loss, scalable throughput (L4S).

8. The method of claim 1, further comprising:
 generating, by the one or more network devices in response to the establishing, information pertaining to the prioritized tunnel;
 storing, by the one or more network devices, the information; and
 determining, by the one or more network devices, that the packets are subject to prioritized data forwarding, based on the information.

9. One or more network devices comprising:
 one or more processors, wherein the one or more processors are configured to:
 receive, from an end device via an untrusted network device, a request, which includes priority data, to establish a prioritized tunnel with the end device;

determine, based on the request, whether to provide the prioritized tunnel or a non-prioritized tunnel, which is a binary choice;
 establish, based on the determining, the prioritized tunnel;
 receive packets of an application session pertaining to the end device and the prioritized tunnel; and
 perform prioritized data forwarding of the packets.

10. The one or more network devices of claim 9, wherein the priority data indicates at least one of explicit congestion notification (ECN) or low latency, low loss, scalable throughput (L4S).

11. The one or more network devices of claim 9, wherein the request includes an Internet Key Exchange (IKE) authentication message.

12. The one or more network devices of claim 9, wherein the processor is further configured to:
 store information pertaining to tunnels with end devices, wherein the information indicates some of the tunnels are prioritized and some of the tunnels are not prioritized.

13. The one or more network devices of claim 9, wherein the prioritized tunnel is an Internet Protocol Security (IPsec) tunnel and the network device is an evolved packet data gateway (ePDG).

14. The one or more network devices of claim 9, wherein the processor is further configured to:
 transmit a message, which includes the priority data, to an upstream core network device of a core network; and
 establish control plane and user plane connections in the core network that relate to the prioritized tunnel and the end device.

15. The one or more network devices of claim 9, wherein the prioritized data forwarding pertains to low latency, low loss, scalable throughput (L4S).

16. The one or more network devices of claim 9, wherein the one or more processors are further configured to:
 generate, in response to the establishing, information pertaining to the prioritized tunnel;
 store the information; and
 determine that the packets are subject to prioritized data forwarding, based on the information.

17. A non-transitory computer-readable storage medium storing instructions executable by one or more processors of one or more network devices, wherein the instructions are configured to:
 receive, from an end device via an untrusted network device, a request, which includes priority data, to establish a prioritized tunnel with the end device;
 determine, based on the request, whether to provide the prioritized tunnel or a non-prioritized tunnel, which is a binary choice;
 establish, based on the determining, the prioritized tunnel;
 receive packets of an application session pertaining to the end device and the prioritized tunnel; and
 perform prioritized data forwarding of the packets.

18. The non-transitory computer-readable storage medium of claim 17, wherein the priority data indicates at least one of explicit congestion notification (ECN) or low latency, low loss, scalable throughput (LAS).

19. The non-transitory computer-readable storage medium of claim 17, wherein the instructions are further configured to:
 transmit a message, which includes the priority data, to an upstream core network device of a core network; and establish control plane and user plane connections in the
    core network that relate to the prioritized tunnel and the
    end device.
  20. The non-transitory computer-readable storage
medium of claim 17, wherein the instructions are further
configured to:
  generate, in response to the establishing, information
    pertaining to the prioritized tunnel;
  store the information; and
  determine that the packets are subject to prioritized data
    forwarding, based on the information.

<div align="center">* * * * *</div>